US011470709B2

(12) United States Patent
Takamatsu et al.

(10) Patent No.: US 11,470,709 B2
(45) Date of Patent: Oct. 11, 2022

(54) MEDIUM TRANSPORT DEVICE, IMAGE READING APPARATUS, AND STATIC ELECTRICITY DETECTION CIRCUIT DETECTING THE STATIC ELECTRICITY OF A SHEET WITH AN ELECTRODE, SEND THE SIGNAL SUPPLIED FROM THE ELECTRODE TO A VOLTAGE CLAMP CIRCUIT, AMPLIFIER CIRCUIT AND RECTIFIER CIRCUIT IN ORDER TO DETECT A MEDIUM

(71) Applicant: SEIKO EPSON CORPORATION, Tokyo (JP)

(72) Inventors: Seiji Takamatsu, Kitakyushu (JP); Yusuke Fukasawa, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 227 days.

(21) Appl. No.: 17/003,312

(22) Filed: Aug. 26, 2020

(65) Prior Publication Data

US 2021/0068240 A1 Mar. 4, 2021

(30) Foreign Application Priority Data

Aug. 30, 2019 (JP) .............................. JP2019-157794

(51) Int. Cl.
*H04N 1/00* (2006.01)
*H05F 3/04* (2006.01)
*B65H 5/00* (2006.01)

(52) U.S. Cl.
CPC ........... *H05F 3/04* (2013.01); *H04N 1/00729* (2013.01); *H04N 1/00801* (2013.01);
(Continued)

(58) Field of Classification Search
CPC ... B65H 7/06; B65H 7/02; B65H 3/06; B65H 2511/242; B65H 2511/214; B65H 2511/51; B65H 2553/20; B65H 2515/716; B65H 2511/515; B65H 2301/5133; H05F 3/04; H05F 1/00; Y02E 10/50
(Continued)

(56) References Cited

U.S. PATENT DOCUMENTS 11,212,402 B2 * 12/2021 Fukasawa .......... H04N 1/00602
11,228,690 B2 * 1/2022 Honda ............... H04N 1/00729
(Continued)

FOREIGN PATENT DOCUMENTS

JP          11316248 A  * 11/1999
JP        2009-507245     2/2009
(Continued)

*Primary Examiner* — Chad Dickerson
(74) *Attorney, Agent, or Firm* — Workman Nydegger

(57) ABSTRACT

A medium transport device includes a transport section transporting a medium in a contact manner, an electrode detecting static electricity charged on the medium, and a static electricity detection circuit. The static electricity detection circuit includes a voltage clamp circuit clamping a detection signal input from the electrode to a predetermined voltage, an amplifier circuit amplifying an output signal of the voltage clamp circuit, a rectifier circuit rectifying an output signal of the amplifier circuit, and a comparator circuit serving as a determination circuit determining whether the medium exists based on an output signal of the rectifier circuit.

7 Claims, 8 Drawing Sheets

(52) U.S. Cl.
CPC ... *H04N 1/00976* (2013.01); *B65H 2515/716* (2013.01); *B65H 2553/232* (2013.01)

(58) Field of Classification Search
USPC ....... 361/214; 358/1.12, 505, 443, 446, 445, 358/300
See application file for complete search history.

(56) References Cited

U.S. PATENT DOCUMENTS

| | | | | |
|---|---|---|---|---|
| 2002/0145637 | A1* | 10/2002 | Umeda | ............... B41J 2/04581 347/9 |
| 2009/0167313 | A1 | 7/2009 | Kraz | |
| 2016/0282792 | A1* | 9/2016 | Nakata | ................... B65H 9/006 |
| 2019/0037092 | A1* | 1/2019 | Shiota | .................. H04N 1/3878 |

FOREIGN PATENT DOCUMENTS

| | | |
|---|---|---|
| JP | 2016-184827 | 10/2016 |
| JP | 2021-036638 | 3/2021 |
| JP | 2021-036639 | 3/2021 |

* cited by examiner

MEDIUM TRANSPORT DEVICE, IMAGE READING APPARATUS, AND STATIC ELECTRICITY DETECTION CIRCUIT DETECTING THE STATIC ELECTRICITY OF A SHEET WITH AN ELECTRODE, SEND THE SIGNAL SUPPLIED FROM THE ELECTRODE TO A VOLTAGE CLAMP CIRCUIT, AMPLIFIER CIRCUIT AND RECTIFIER CIRCUIT IN ORDER TO DETECT A MEDIUM

The present application is based on, and claims priority from JP Application Serial Number 2019-157794, filed Aug. 30, 2019, the disclosure of which is hereby incorporated by reference herein in its entirety.

BACKGROUND

1. Technical Field

The present disclosure relates to a medium transport device detecting a medium by detecting static electricity charged on the medium, such as a sheet, an image reading apparatus, and a static electricity detection circuit.

2. Related Art

JP-A-2016-184827 discloses an image reading apparatus including a medium transport device. The medium transport device includes a skew detection unit detecting skew of a medium using a pair of document width sensors disposed in a direction of a medium width and a feed-out sensor disposed between the pair of document width sensors in the medium width direction in a portion on an upstream of the document width sensors in the medium transport direction. When an amount of skew detected by the skew detection unit exceeds a predetermined amount, transport of a document is stopped. General medium transport devices include a sensor detecting a medium.

An optical sensor detecting a medium without contact or a contact sensor to be in contact with a medium is used as the sensor detecting a medium, such as the document width sensors or the feed-out sensors, discloses in JP-A-2016-184827. However, a configuration thereof is complicated although the sensor may detect a medium at high speed with a less response lag. Therefore, sensor components are comparatively expensive, and therefore, fabrication cost of the device is increased. Accordingly, there is a demand for a device of a simple configuration detecting a medium at high speed by utilizing characteristics of the medium.

SUMMARY

According to an aspect of the present disclosure, a medium transport device includes a transport section configured to transport a medium in a contact manner, an electrode configured to detect static electricity charged on the medium transported by the transport section, a voltage clamp circuit configured to clamp a detection signal supplied from the electrode to a predetermined voltage, an amplifier circuit configured to amplify an output signal of the voltage clamp circuit, a rectifier circuit configured to rectify an output signal of the amplifier circuit, and a determination circuit configured to detect the medium based on an output signal of the rectifier circuit.

According to another aspect of the present disclosure, an image reading apparatus includes the medium transport device and a reading section configured to read the medium.

According to a further aspect of the present disclosure, a static electricity detection circuit detects the medium by receiving a detection signal from an electrode disposed in a position to be in contact with the medium on a transport path of a medium charged by static electricity. The static electricity detection circuit includes a voltage clamp circuit configured to clamp a detection signal supplied from the electrode to a predetermined voltage, an amplifier circuit configured to amplify an output signal of the voltage clamp circuit, a rectifier circuit configured to rectify an output signal of the amplifier circuit, and a determination circuit configured to detect the medium based on an output signal of the rectifier circuit.

DESCRIPTION OF EXEMPLARY EMBODIMENTS

First Embodiment

Hereinafter, a first embodiment of an image reading apparatus including a medium transport device will be described with reference to the accompanying drawings. Note that the image reading apparatus of this embodiment includes the medium transport device transporting media, such as documents, and is a feeding type scanner having a reading section reading an image on a medium during transport of the medium.

Figure 1:
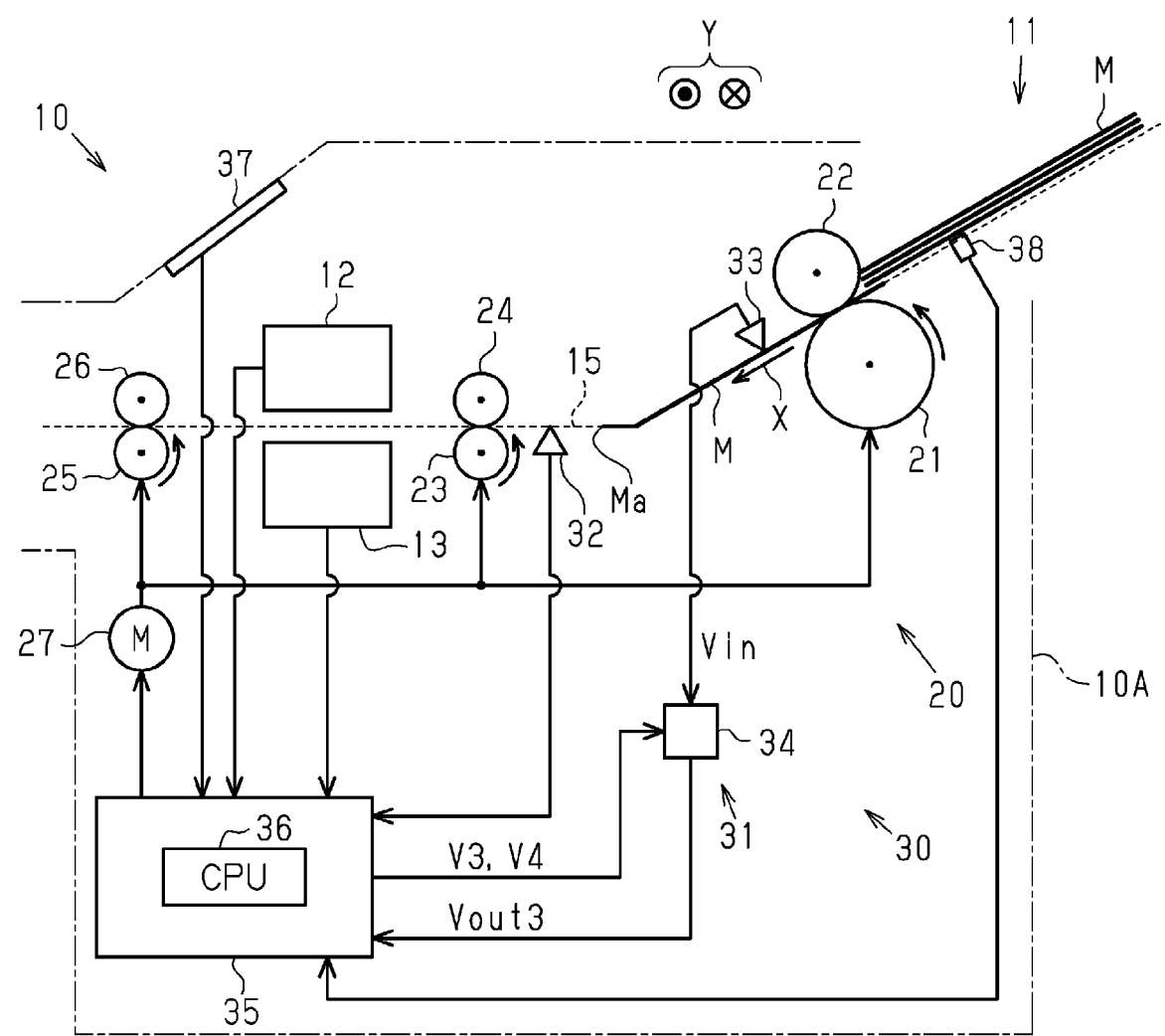
FIG. 1 is a side view schematically illustrating an image reading apparatus according to a first embodiment.

As illustrated in FIG. 1, an image reading apparatus 10 of this embodiment includes a case 10A and a medium transport device 30 transporting media M along a transport path 15. The medium transport device 30 includes a medium holding section 11 holding the stacked media M and a transport section 20 transporting the media M held by the medium holding section 11 one by one. The transport section 20 is disposed in the case 10A. The media M are sheets, for example, and have an electrical insulation property.

The image reading apparatus 10 includes a medium transport device 30 and reading sections 12 and 13 reading an image on a medium M transported along the transport path 15. In the example of FIG. 1, the image reading apparatus 10 includes the first reading section 12 reading an image on a front surface of the medium M and the second reading section 13 reading an image on a back surface of the medium M. Each of the reading sections 12 and 13 is constituted by a contact image sensor (CIS) or a charge coupled device (CCD) image sensor.

The transport section 20 transports the medium M while being in contact with the medium M. Here, the term "contact" includes friction and peeling between the transport section 20 and the medium M. The medium M has static electricity generated by frictional electrification caused by friction with the transport section 20 or peeling electrification caused by peeling when the medium M is transported. The transport section 20 includes a supply roller 21 supplying the medium M held by the medium holding section 11 toward the reading sections 12 and 13 and a separation section 22 nipping the medium M with the supply roller 21. Examples of the separation section 22 include a separation roller and a separation plate. When the separation roller is employed as the separation section 22, rotation of the separation roller may be restricted by rotating the separation roller in a direction opposite to rotation of the supply roller 21 at a peripheral speed lower than a peripheral speed of the supply roller 21, or a force toward an upstream of a transport direction X may be applied to the front surface of the medium M by rotating the separation roller in a direction the same as the rotation direction of the supply roller 21. Note that the medium M has static electricity by mainly frictional electrification generated by friction with the separation section 22 in this embodiment.

In the transport section 20 of this embodiment, the medium M is nipped by the supply roller 21 and the separation section 22 and is supplied to a downstream in a transport direction X by the rotation of the supply roller 21. In this case, friction occurs between the medium M and the supply roller 21 and between the medium M and the separation section 22. By this friction, static electricity is generated in the medium M. Consequently, both the front surface and the back surface of the medium M are electrified.

The transport section 20 further includes transport rollers 23 and 24 disposed between the supply roller 21 and the reading sections 12 and 13 in the transport direction X of the medium M and discharge rollers 25 and 26 disposed on a downstream of the reading sections 12 and 13 in the transport direction X.

The medium transport device 30 includes a driving motor 27 serving as a power source of the supply roller 21, the transport roller 23, and the discharge roller 25. When power is supplied from the driving motor 27 through a power transmission mechanism, not illustrated, to the supply roller 21, the transport roller 23, and the discharge roller 25, the supply roller 21, the transport rollers 23 and 24, and the discharge rollers 25 and 26 are rotated, and therefore, the medium M is transported from the upstream to the downstream in the transport direction X along the transport path 15. Note that the transport direction X directs along the transport path 15 and is changed depending on a position on the transport path 15 in FIG. 1. The transport direction X may be constant irrespective of a position on the transport path 15.

The medium transport device 30 of this embodiment includes a plurality of sensors 31 and 32 detecting the medium M transported from the upstream to the downstream in the transport direction X along the transport path 15. In this example, the first sensor 31 is disposed on the upstream and the second sensor 32 is disposed on the downstream.

Figure 2:
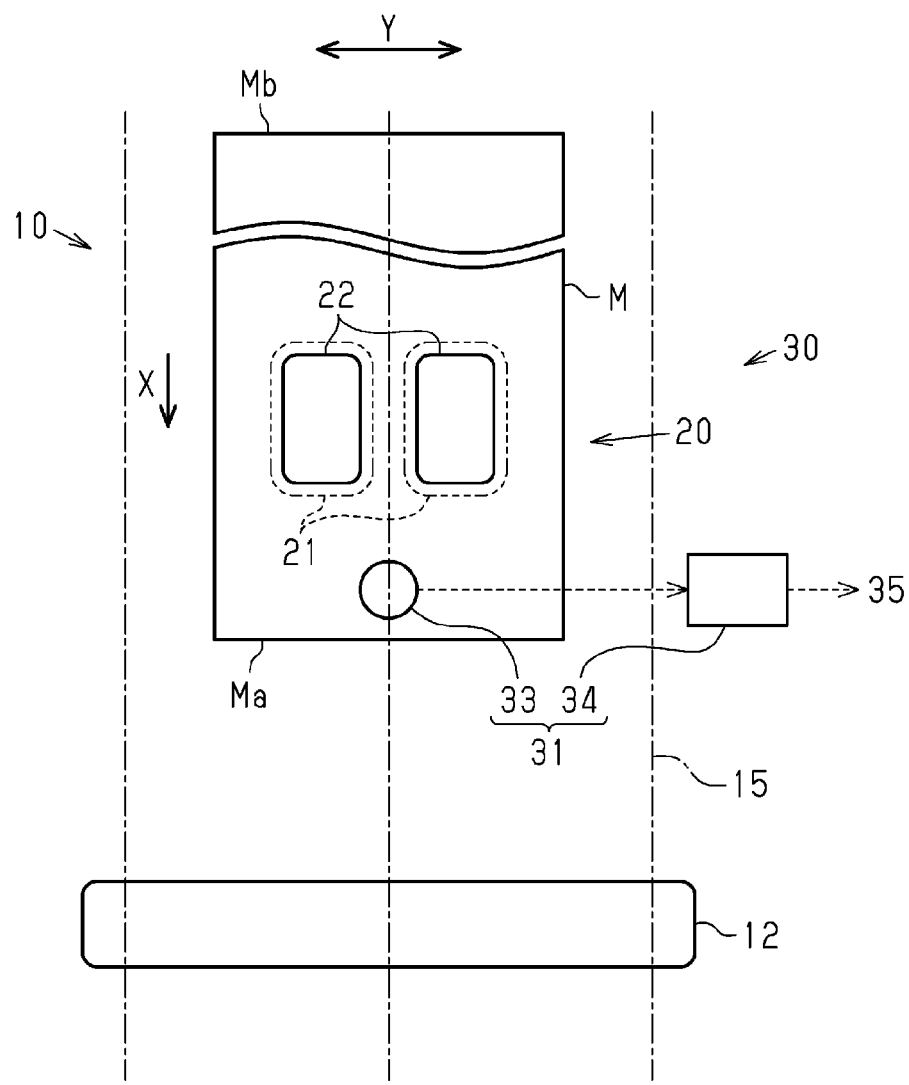
FIG. 2 is a plan view schematically illustrating a portion of the image reading apparatus.

The first sensor 31 illustrated in FIGS. 1 and 2 is an electrostatic detection sensor. The electrostatic detection sensor 31 includes an electrode 33 disposed in a position on a downstream of the separation section 22 in the transport direction X and an static electricity detection circuit 34 coupled to the electrode 33. The electrode 33 detects static electricity charged on the medium M. The electrode 33 is disposed between the separation section 22 and the transport rollers 23 and 24 in the transport direction X. Assuming that a width direction of the medium M transported along the transport path 15 is denoted by Y, the electrode 33 is disposed at a center of the transport path 15 in the width direction Y, for example. A dashed-dotted line in FIG. 2 indicates the center of the transport path 15 in the width direction Y. The medium holding section 11 guides the medium M such that a center of the width of the medium M is positioned at the center in the width direction Y. The medium M is transported through a path such that the width center of the medium M passes the center of the transport path 15 irrespective of a width size. Therefore, the electrode 33 is disposed such that the electrode 33 may be in contact with different media M having different width sizes. The electrode 33 is constituted by a metallic brush or the like. The blush is a neutralization brush, for example. Note that the electrode 33 is not limited to a brush and is at least a member which has a conductive property and which is easily deformed so as not to scratch the medium M. Note that the transport rollers 23 and 24 are omitted in FIG. 2.

The static electricity detection circuit 34 receives an input signal Vin from the electrode 33 and detects a change of a voltage which occurs when the electrode 33 is brought in contact with the medium M electrified by static electricity so as to output an output signal Vout3 indicating detection of the medium M.

The second sensor 32 is disposed in a position on a downstream of the supply roller 21 in the transport direction X and on an upstream of the transport rollers 23 and 24 in the transport direction X. The second sensor 32 detects a leading end Ma of the medium M. When the second sensor 32 detects the leading end Ma of the medium M, the reading sections 12 and 13 start reading of an image on the medium M.

As illustrated in FIGS. 1 and 2, the image reading apparatus 10 includes a controller 35 controlling the entire apparatus. The static electricity detection circuit 34 and the second sensor 32 are electrically coupled to the controller 35. Furthermore, the driving motor 27 serving as a driving source of the transport section 20 is electrically coupled to the controller 35. The controller 35 controls the driving motor 27 so as to control supply and transport of the medium M. Furthermore, the controller 35 controls a reading operation of the reading sections 12 and 13. The controller 35 instructs the reading sections 12 and 13 to start the reading operation based on a signal obtained when the second sensor 32 detects the leading end Ma of the medium M. The controller 35 instructs a predetermined one of the reading sections 12 and 13 to perform the reading operation when single-side reading is specified and instructs both the reading sections 12 and 13 to perform the reading operation when both-side reading is specified. When receiving reading data read by the reading sections 12 and 13, the controller 35 performs a required process on the reading data before transferring the reading data to a transfer destination, such as a personal computer, specified by a user.

The controller 35 includes a central processing unit (CPU) 36 and a storage section (not illustrated). The CPU 36 obtains medium type information indicating a type of the medium M. Examples of the medium type include types of paper, such as plain paper, photo paper, and coated paper. The examples of the medium type may further include types of document, such as passports. The examples of the medium type may further include media made of synthetic resin and cards. Examples of types of medium made of synthetic resin may include, in addition to overhead projector (OHP) sheets, carrier sheets which hold a half-fold document therebetween, such as a personal resume. Furthermore, static electricity may be differently charged, that is, positively charged or negatively charged, on plain paper depending on a manufacturer or material of paper fibers, or an amount of charge may be differentiated depending on easiness of charge of the static electricity. In the same plain paper, the medium type may be different depending on a manufacturer or a product number taking such cases into consideration.

The storage section stores reference data indicating the correspondence relationships between medium types and threshold values V3. The CPU 36 may obtain information of a medium type when the user inputs the information on a medium type by operating an operation section 37 of the image reading apparatus 10 or by operating an input device (not illustrated) of an external apparatus, such as a personal computer, coupled to the image reading apparatus 10 in a communication available manner. Furthermore, the image reading apparatus 10 may include a medium type detection sensor 38 detecting a medium type of the medium M stored in the medium holding section 11 and the CPU 36 may obtain the medium type detected by the medium type detection sensor 38. The CPU 36 sets a threshold value V3 obtained with reference to the reference data stored in the storage section to the static electricity detection circuit 34 based on the obtained information on a medium type. Specifically, the CPU 36 of the controller 35 sets a threshold value V3 determined in accordance with a medium type to a comparator circuit 70 (refer to FIG. 3) which is an example of a determination circuit included in the static electricity detection circuit 34. Note that the operation section 37 operated by the user inputting medium type information is an example of a medium type obtaining section obtaining medium type information indicating a type of the medium M in this embodiment. Furthermore, the medium type detection sensor 38 is an example of the medium type obtaining section obtaining the medium type information indicating a type of the medium M in this embodiment.

A result of a determination as to whether the first sensor 31 including the electrode 33 and the static electricity detection circuit 34 is detected may be used to detect the leading end Ma and a trailing end Mb of the medium M. That is, the leading end Ma of the medium M may be detected when switching from a state in which the medium M is not detected to a state in which the medium M is detected is performed, and the trailing end Mb of the medium M may be detected when switching from the state in which the medium M is detected to the state in which the medium M is not detected is performed.

Furthermore, the CPU 36 may perform any control on the image reading apparatus 10 utilizing a result of the detection of the medium M. The CPU 36 may perform control on a timing when the reading operation is started in the reading sections 12 and 13, control on a reading end timing, control on a determination as to whether a medium jam has occurred, and transport control. The medium jam is determined by one of two methods. As a first method, it is determined that the jam has occurred when another sensor does not detect the medium M although the medium M is transported in a distance sufficient for the detection by the other sensor located on a downstream in the transport direction X after the electrode 33 detects the leading end Ma of the medium M. As the other sensor, the second sensor 32 is used, for example. As a second method, it is determined that the jam has occurred when the electrode 33 does not detect the trailing end Mb of the medium M although the medium M is transported in the transport direction X in a predetermined distance longer than a medium length indicating a length of the medium M in the transport direction X after the electrode 33 detects the leading end Ma of the medium M.

Furthermore, a plurality of electrodes 33 may be disposed in different positions in the width direction Y so as to perform a skew detection utilizing a fact that timings when the plurality of electrodes 33 detect the skewed medium M diagonally inclined relative to the transport direction X are different from timings when the plurality of electrodes 33 detect the medium not skewed, that is, in a normal orientation. In this case, static electricity detection circuits 34 are disposed for the respective electrodes 33. The CPU 36 receives output signals Vout3 from the individual static electricity detection circuits 34. The CPU 36 detects occurrence of skew and shift amounts of the skew based on the timings when the medium M is detected based on the individual output signals Vout3.

Figure 4:
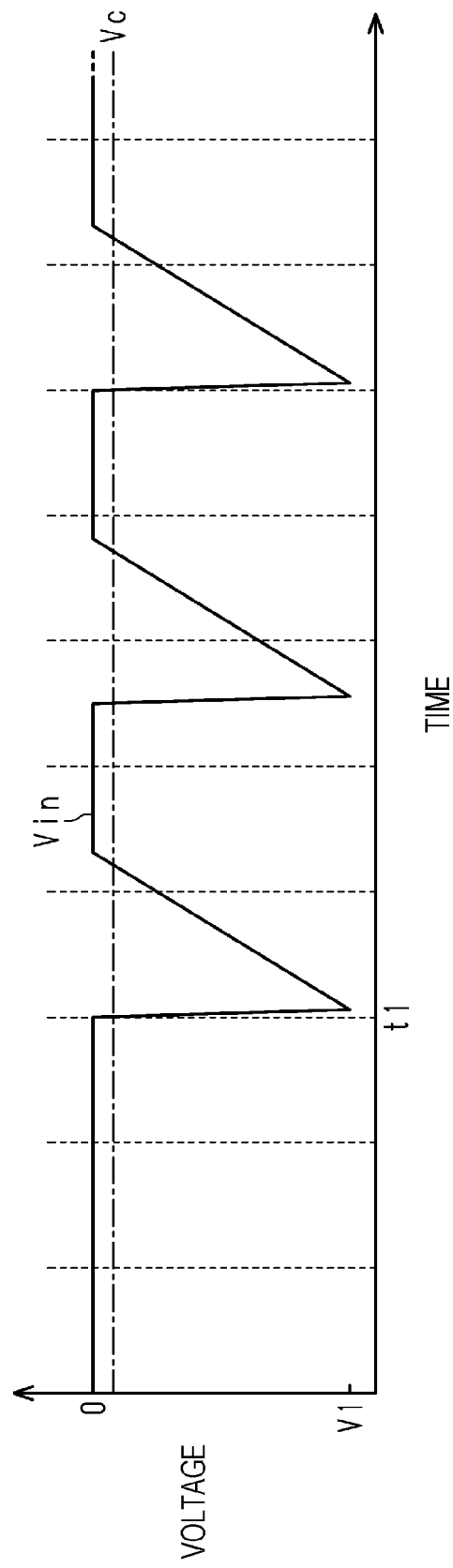
FIG. 4 is a graph of a waveform of a detection signal obtained when a medium is negatively charged.
Figure 8:
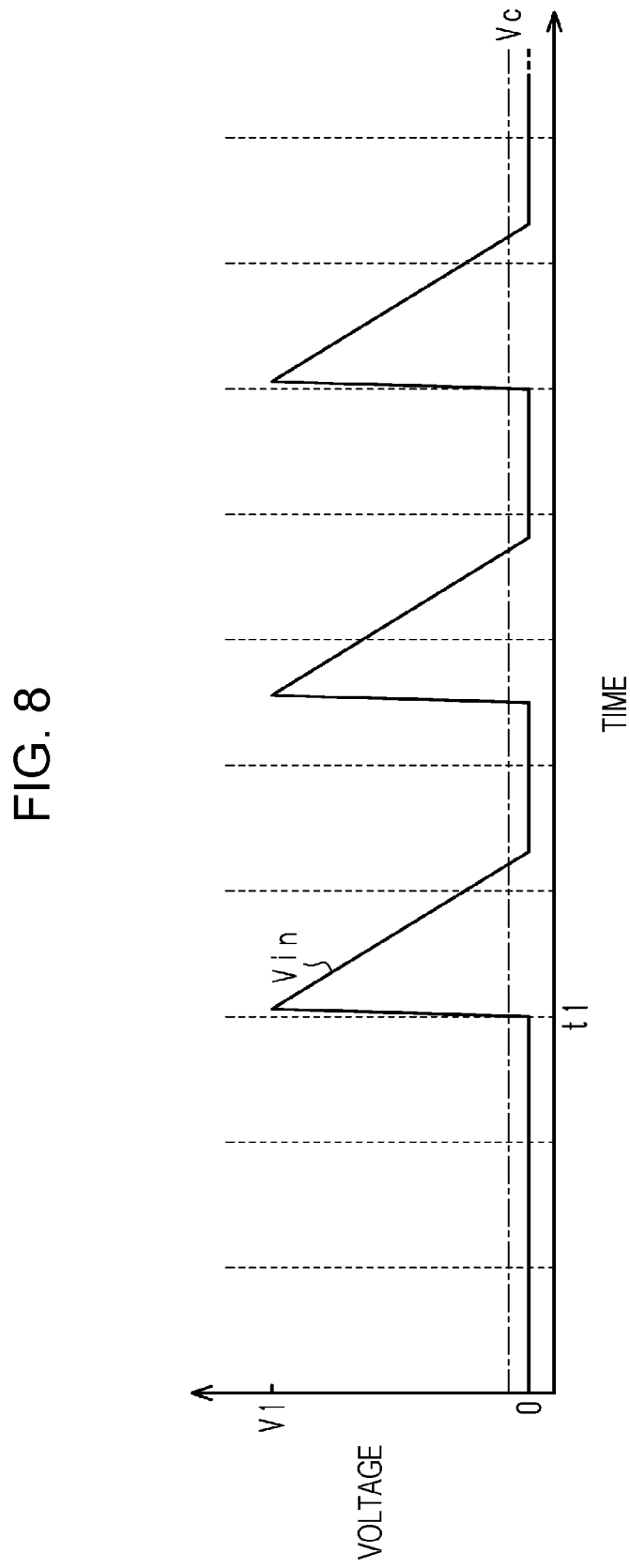
FIG. 8 is a graph of a waveform of a detection signal obtained when a medium is positively charged.

When the medium M is stopped in a state in which the electrode 33 is in contact with the front surface of the medium M, the stopped medium M may not be detected since static electricity has been discharged from a portion on the front surface of the medium M with which the electrode 33 is in contact. When the medium M is moved again, the electrode 33 is brought into contact with the electrified portion of the medium M, charge caused by the static electricity is applied to the electrode 33, and an input signal Vin illustrated in FIGS. 4 and 8 is supplied to the static electricity detection circuit 34. However, a movement start position of the medium M and the leading end Ma of the medium M may not be distinguished from each other. However, in the image reading apparatus 10, the medium M is continuously transported without being stopped during the reading operation, and therefore, the medium M may be detected from the leading end Ma to the trailing end Mb.

Furthermore, since a capacitor included in the static electricity detection circuit 34 stores charge even when the trailing end Mb of the medium M passes the electrode 33 and the electrode 33 does not detect static electricity, the output signal Vout3 remains in an ON state. Therefore, when it is determined that the trailing end Mb of the preceding medium M has passed, an ON signal of the voltage V4 is applied to a discharge circuit 90 (refer to FIG. 3) included in the static electricity detection circuit 34 so that a predetermined output stage of the static electricity detection circuit 34 performs discharge. The CPU 36 may cause the electrode 33 to detect the leading end Ma of the succeeding medium M by the discharge of the static electricity detection circuit 34 after the trailing end Mb of the preceding medium M passes the electrode 33. In this example, the second sensor 32 is disposed to detect the trailing end Mb which is an upstream end of the medium M in the transport direction X and which has passed the electrode 33. When the second sensor 32 detects the leading end Ma of the medium M, the CPU 36 of the controller 35 causes a counter, not illustrated, to perform a counting process so as to count the number of pulses or the number of pulse edges included in a detection signal detected by an encoder, not illustrated, detecting rotation of the driving motor 27. The CPU 36 determines that the trailing end Mb of the medium M has passed a position of the electrode 33 when a counting value of the counter reaches a target value corresponding to a length obtained by subtracting a distance between a detection position of the second sensor 32 and a position of the electrode 33 on the transport path from a medium length which is a length of the medium M being transported in the transport direction X. The CPU 36 outputs an ON signal of the voltage V4 to the static electricity detection circuit 34 when determining that the trailing end Mb of the medium M has passed the position of the electrode 33. In this way, the controller 35 resets the static electricity detection circuit 34 at a predetermined timing based on a result of the detection performed by the second sensor 32. Consequently, the output signal Vout3 is reset to a low level (0 V), and the electrode 33 and the static electricity detection circuit 34 may detect a succeeding medium M. Furthermore, the controller 35 includes a flag in the storage section. When the output signal Vout3 is switched from the low level to a high level, the flag is turned on to "1" whereas when the counting value of the counter reaches the target value, the flag is turned off to "0". The CPU 36 may determine whether the medium M exists in the position of the electrode 33 in accordance with a value of the flag.

Note that the CPU 36 may use the first sensor 31 as the sensor for obtaining a timing when the static electricity detection circuit 34 is reset. When the first sensor 31 detects the leading end Ma of the medium M, the CPU 36 causes the counter, not illustrated, to perform the counting process so as to count the number of pulses or the number of pulse edges included in the detection signal detected by the encoder, not illustrated, detecting rotation of the driving motor 27. The CPU 36 determines that the trailing end Mb of the medium M has passed the position of the electrode 33 when a counting value of the counter reaches a target value corresponding to a medium length which is the length of the medium M being transported in the transport direction X. The CPU 36 outputs an ON signal of the voltage V4 to the static electricity detection circuit 34 when determining that the trailing end Mb of the medium M has passed the position of the electrode 33.

Configuration of Static Electricity Detection Circuit

Next, the static electricity detection circuit 34 will be described in detail with reference to FIG. 3. The static electricity detection circuit 34 detects a sharp change of the voltage V1 caused by positive and negative static electricity generated when the transported medium M is in contact with the electrode 33. The static electricity detection circuit 34 may detect static electricity both when the medium M is positively charged and when the medium M is negatively charged. The static electricity detection circuit 34 detects an instantaneous rise to the voltage V1 caused by the static electricity generated when the electrode 33 is brought into contact with the medium M and outputs an output signal Vout3 which changes from a low level to a high level.

Figure 3:
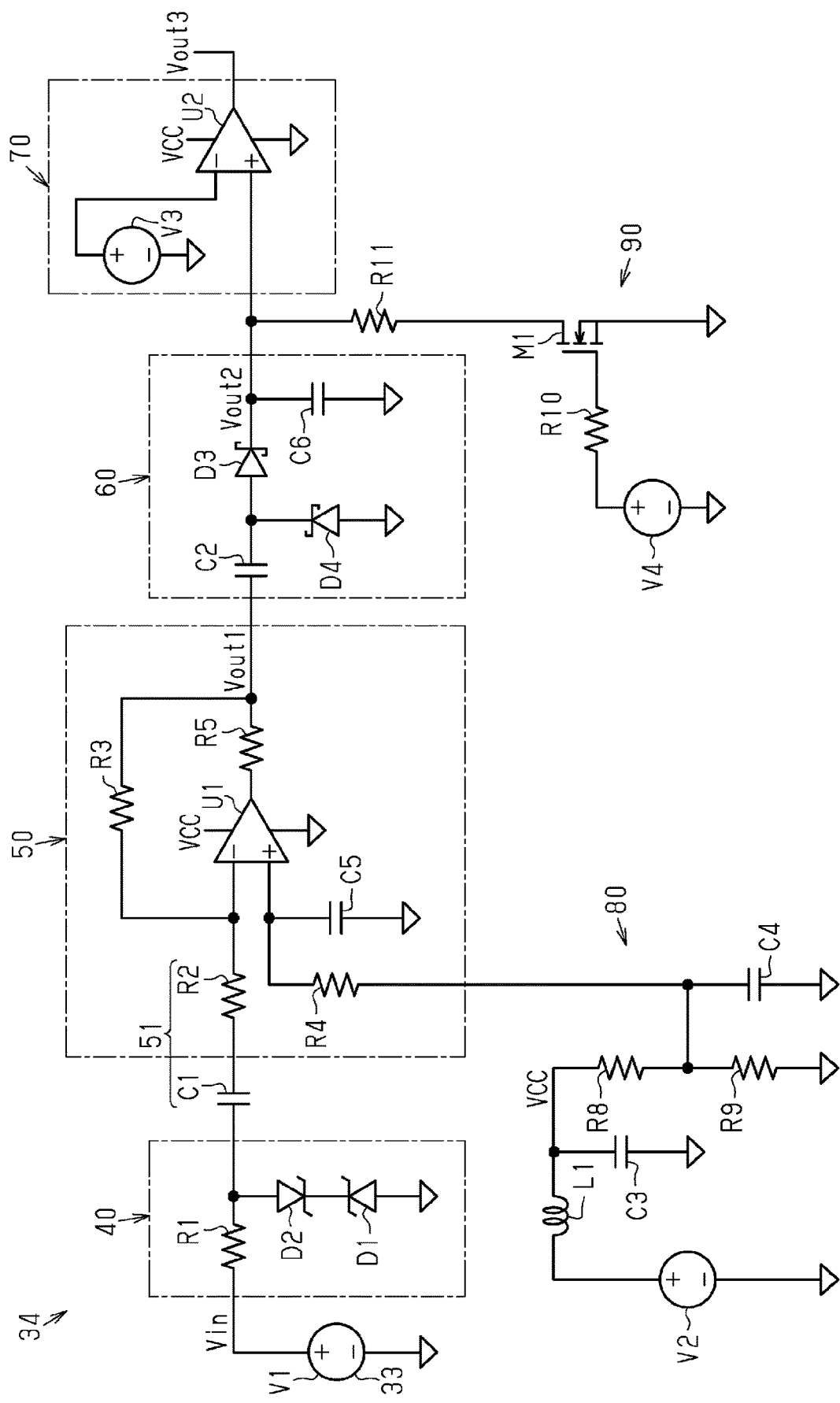
FIG. 3 is a circuit diagram illustrating a static electricity detection circuit.

As illustrated in FIG. 3, the static electricity detection circuit 34 includes a voltage clamp circuit 40, an amplifier circuit 50, a rectifier circuit 60, the comparator circuit 70, a reference voltage generation circuit 80, and a discharge circuit 90. The voltage clamp circuit 40, the amplifier circuit 50, the rectifier circuit 60, and the comparator circuit 70 are coupled in series. The voltage clamp circuit 40 clamps an input signal Vin which is a detection signal input from the electrode 33 to a predetermined voltage Vc. The amplifier circuit 50 amplifies a signal output from the voltage clamp circuit 40. The rectifier circuit 60 rectifies an output signal Vout1 of the amplifier circuit 50. The comparator circuit 70 which is an example of a determination circuit determines whether a medium exists based on an output signal Vout2 of the rectifier circuit 60. The comparator circuit 70 outputs an output signal Vout3 indicating a result of the determination as to whether the medium M exists. The output signal Vout3 is brought into a low level when the medium M is not detected and into a high level when the medium M is detected.

The reference voltage generation circuit 80 generates a reference voltage Vref to be input to a non-inversion input terminal of an operation amplifier U1 included in the amplifier circuit 50. Furthermore, the voltage clamp circuit 40 and the amplifier circuit 50 are coupled to each other through a capacitor C1. The discharge circuit 90 causes a capacitor C6 which determines a potential of the output signal Vout2 to be output from the rectifier circuit 60 and supplied to the comparator circuit 70 to perform discharge so as to reset the output signal Vout3 of the comparator circuit 70 to a low level.

Hereinafter, the circuits included in the static electricity detection circuit 34 will be described in detail with reference to FIG. 3. The voltage clamp circuit 40 clamps a voltage so that static electricity of a high voltage is not applied to the amplifier circuit 50. Specifically, the voltage clamp circuit 40 prevents destroy of the circuits due to the static electricity of a high voltage. The voltage clamp circuit 40 includes a resistor R1 and two Zener diodes D1 and D2. One terminal of the resistor R1 on a low potential side is coupled to the ground through the two Zener diodes D1 and D2 coupled in series in opposite directions. The resistor R1 suppresses current supplied to the circuit even when a high voltage of several kV is applied due to static electricity. Since the two Zener diodes D1 and D2 are coupled to each other in the opposite directions, the Zener diode D1 clamps a positive voltage to a predetermined voltage Vc and the Zener diode D2 clamps a negative voltage to the predetermined voltage Vc. Specifically, the Zener diodes D1 and D2 suppress the positive voltage or the negative voltage to a constant voltage sufficiently lower than the voltage V1. In this way, the voltage clamp circuit 40 clamps a voltage when a voltage of an input signal Vin of static electricity is a negative voltage or a positive voltage. The voltage clamp circuit 40 outputs a signal oscillated with a ground voltage of 0 V at a center in a range equal to or smaller than the clamped predetermined voltage Vc.

The amplifier circuit 50 outputs an output signal Vout1 obtained by amplifying an input signal input from the voltage clamp circuit 40. The amplifier circuit 50 includes a resistor R2, an operation amplifier U1, a capacitor C5, and resistors R3 to R5. The operation amplifier U1 is an inverting amplifier. The operation amplifier U1 has a non-inverting input terminal receiving a reference voltage Vref generated by the reference voltage generation circuit 80. The reference voltage Vref is half a power source voltage VCC, for example. Specifically, Vref is equal to VCC/2. The amplifier circuit 50 includes the resistor R2 coupled to the capacitor C1 in series. The inverting input terminal of the operation amplifier U1 is coupled to the voltage clamp circuit 40 through the capacitor C1 and the resistor R2 coupled to each other in series. The operation amplifier U1 has an output terminal coupled to the resistor R5, and a low voltage terminal of the resistor R5 is coupled to the non-inverting input terminal of the operation amplifier U1 through the resistor R3. The resistor R4 and the capacitor C5 stabilize the reference voltage Vref (=VCC/2) to be supplied to the non-inverting input terminal of the operation amplifier U1.

The reference voltage generation circuit 80 generates the reference voltage VCC/2 to be supplied to the non-inverting input terminal of the operation amplifier U1 included in the amplifier circuit 50. The reference voltage generation circuit 80 includes a coil L1, capacitors C3 and C4, and resistors R8 and R9. A voltage V2 is the power source voltage VCC, for example, which is divided by the resistors R8 and R9 so that the reference voltage VCC/2 is generated as the reference voltage Vref. The coil L1 and the capacitor C3 remove ripples of the voltage V2. The capacitor C4 reduces impedance of the reference voltage Vref so that oscillation of the operation amplifier U1 is suppressed. Note that the power source voltage VCC is 3.3 V, for example.

The capacitor C1 offsets a difference between a center potential of 0V of the voltage clamp circuit 40 which is an input stage and the reference voltage Vref (>0) which is a center potential of the amplifier circuit 50 which is an output stage. Specifically, on both sides of the capacitor C1, an output signal output from the voltage clamp circuit 40 is amplified with 0 V (ground voltage) at a center and an input signal input to the amplifier circuit 50 is amplified with the reference voltage Vref (>0) as a center potential. The capacitor C1 offsets the difference between the center potentials. The capacitor C1 and the resistor R2 coupled to each other in series between the voltage clamp circuit 40 and the inverting input terminal of the operation amplifier U1 are included in a high-pass filter 51.

The rectifier circuit 60 rectifies an output signal Vout1 of the amplifier circuit 50 so as to output an output signal Vout2. The rectifier circuit 60 includes a capacitor C2, diodes D3 and D4, and a capacitor C6. The diodes D3 and D4 are Schottky diodes, for example. The rectifier circuit 60 includes the capacitor C6 in an output stage.

The comparator circuit 70 compares the output signal Vout2 with a threshold value V3 (reference voltage) so as to determine whether the medium M exists. The comparator circuit 70 outputs an output signal Vout3 as a result of the comparison corresponding to presence or absence of the medium M. The comparator circuit 70 includes a comparator U2. A threshold value V3 is input as a reference voltage of the comparator U2. The threshold value V3 is controlled by the CPU 36. The CPU 36 sets the threshold value V3 corresponding to a medium type. For example, the CPU 36 obtains a threshold value V3 corresponding to a medium type with reference to reference data, not illustrated, based on a medium type obtained from reading condition data and inputs the obtained threshold value V3 as a reference voltage of the comparator U2. Specifically, the CPU 36 changes the threshold value V3 of the comparator U2 in accordance with a medium type. A first threshold value which is a threshold value of a first medium which is easily charged is higher than a threshold value of a second medium which is more difficult to be charged than the first medium.

When the output signal Vout2 input to the comparator U2 oscillates near the threshold value V3, the output signal Vout3 of the comparator U2 is repeatedly turned on and off. To avoid this, the CPU 36 performs control such that the threshold value has a hysteresis. Specifically, when the output voltage Vout2 exceeds the threshold value V3, the threshold value V3 is reduced so that an adverse effect of the amplitude of the output signal Vout2 is avoided. Alternatively, a dead band may be set in the comparator U2. For example, when the output signal Vout3 rises from a low level to a high level when the output voltage Vout2 exceeds the threshold value V3, the CPU 36 sets a predetermined waiting time in which a determination based on the output signal Vout3 is not performed as a dead band so as to avoid misdetection caused by chattering of the output signal Vout3.

The discharge circuit 90 of FIG. 3 performs discharge to determine a potential of the output signal Vout2 of the rectifier circuit 60. Specifically, the discharge circuit 90 selectively performs discharge in the output stage of the rectifier circuit 60. The rectifier circuit 60 stores charge in the capacitor C6 in the output stage so as to maintain the output signal Vout2 in a constant voltage. The discharge circuit 90 causes the capacitor C6 to perform discharge so that the output signal Vout2 is reset to 0V. An ON signal of the voltage V4 is input from the CPU 36 to the discharge circuit 90. The discharge circuit 90 includes resistors R10 and R11 and a transistor M1.

The CPU 36 of the controller 35 controls the discharge circuit 90 so as to cause the rectifier circuit 60 to perform discharge in the output stage at a timing after the trailing end Mb which is the upstream end of the medium M in the transport direction X has passed the electrode 33 and before a succeeding medium M reaches the electrode 33. In this example, when the trailing end Mb of the medium M passes the electrode 33, the CPU 36 outputs an ON signal of the voltage V4 to the discharge circuit 90 so that the transistor M1 is turned on from an OFF state. When the transistor M1 is turned on, the output terminal of the rectifier circuit 60 performs discharge and the output signal Vout2 is reset to 0V (a low level). When the CPU 36 of the controller 35 detects the leading end Ma which is a downstream end of the medium M in the transport direction X and determines that the trailing end Mb which is the upstream end of the medium M in the transport direction X has passed the electrode 33 based on an amount of transport of the medium M performed by the transport section 20, the CPU 36 controls the discharge circuit 90 so as to cause the rectifier circuit 60 to perform discharge.

For example, when the second sensor 32 detects the leading end Ma of the medium M, the CPU 36 starts counting using the counter so as to count the number of pulses or the number of pulse edges included in a detection signal output from the encoder detecting rotation of the driving motor 27. When a counting number of the counter reaches a value corresponding to a length obtained by subtracting a distance on a transport path between a detection position of the second sensor 32 and a position of the electrode 33 from a medium length of the medium M being transported, that is, when the trailing end Mb of the medium M passes the position of the electrode 33, the CPU 36 outputs an ON signal of the voltage V4 to the static electricity detection circuit 34. Alternatively, when the leading end Ma is detected based on the output signal Vout3 input from the static electricity detection circuit 34 at a time when the leading end Ma of the medium M reaches the electrode 33, the CPU 36 starts counting using the counter so as to count the number of pulses or the number of pulse edges included in a detection signal of the encoder detecting rotation of the driving motor 27. The CPU 36 outputs an ON signal of the voltage V4 to the static electricity detection circuit 34 when the counting value of the counter reaches a value corresponding to a transport amount corresponding to a medium length of the medium M being transported. Note that the medium length is obtained based on information on a medium size input by the user operating the operation section 37 or an input device included in an external apparatus, such as a personal computer.

Next, the input signal Vin input to the static electricity detection circuit 34 and the output signals Vout1 to Vout3 of the main circuits included in the static electricity detection circuit 34 will be described. FIG. 4 is a graph illustrating the input signal Vin obtained when the medium M is negatively charged due to static electricity, and FIG. 8 is a graph illustrating the input signal Vin obtained when the medium M is positively charged due to static electricity. In the graphs of FIGS. 4 and 8, an axis of abscissae denotes time and an axis of ordinates denotes a voltage.

Positive or negative of charge obtained when the medium M is charged by static electricity is determined in accordance with the correspondence relationship between material of the medium M and material of a member of a friction counterpart which is brought into contact with the medium M and applies frictional force to the medium M when the medium M is transported. Specifically, in the image reading apparatus 10, positive or negative of charge and an amount of charge obtained when the medium M is charged by static electricity are determined in accordance with the correspondence relationship between the material of the medium M and the material of the separation section 22 which is in contact with the medium M in an upstream position in the transport section 20 relative to the electrode 33 in the transport direction X. When the medium M is a sheet, a positive charge or a negative charge is generated by static electricity caused by friction between the sheet and the separation section 22 depending on material, such as paper fibers, or a manufacturer.

Output Signal in Negative Charge

An input signal Vin obtained when the electrode 33 is brought into contact with the medium M negatively charged by static electricity as illustrated in FIG. 4 is input to the static electricity detection circuit 34 from the electrode 33. At a time point t1 when the electrode 33 is brought into contact with the medium M, a voltage of 0V falls to a voltage V1 (<0). The voltage V1 of the input signal Vin is in a range from approximately 1 kV to approximately 10 kV as an absolute value. FIG. 4 is the graph of a signal defined as an input signal Vin by international standard evaluating static electricity. The input signal Vin falls on a negative side to the voltage V1 (<0) in 10 nanoseconds, and thereafter, rises on a positive side in 100 nanoseconds. As illustrated in FIG. 4, the input signal Vin instantaneously (in 10 nanoseconds) falls to the voltage V1 (<0) and rises in tenfold time (100 nanoseconds) of the falling time, that is, the input signal Vin has peaks generated in a predetermined period.

Next, the output signals Vout1 to Vout3 of the main circuits included in the static electricity detection circuit 34 which receives the input signal Vin illustrated in FIG. 4 from the electrode 33 will be described with reference to FIGS. 5 to 7.

Figure 5:
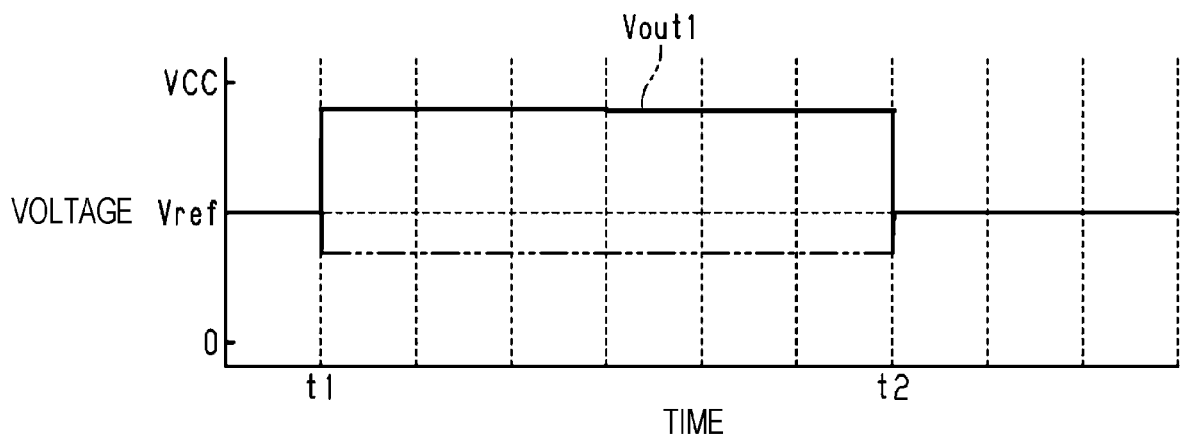
FIG. 5 is a graph of an output signal Vout1 of an amplifier circuit included in the static electricity detection circuit.

As illustrated in FIG. 5, after being clamped to a predetermined voltage (a clamp voltage) Vc (refer to FIG. 4) or less by the voltage clamp circuit 40, the input signal Vin is amplified by the amplifier circuit 50 and output as the output signal Vout1. Here, the voltage clamp circuit 40 outputs a signal oscillated in the same period as the input signal Vin with an intermediate potential of 0 V in a range in which a maximum oscillation is the predetermined voltage Vc so as to clamp the input signal Vin to the predetermined voltage Vc or less (refer to FIG. 4). The amplifier circuit 50 amplifies a signal output from the voltage clamp circuit 40. Therefore, the amplifier circuit 50 outputs the output signal Vout1 having a voltage which rises at the time point t1 and oscillates in the same period as the input signal Vin with the reference voltage Vref at a center. The maximum oscillation of the output signal Vout1 is suppressed to a voltage obtained by multiplying the predetermined voltage Vc by an amplification factor of the amplifier circuit 50 or less.

Figure 6:
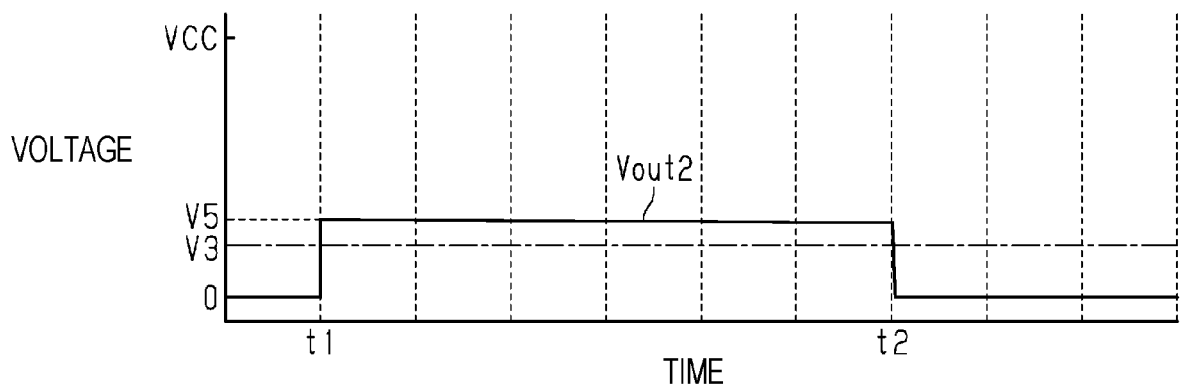
FIG. 6 is a graph of an output signal Vout2 of a rectifier circuit included in the static electricity detection circuit.

FIG. 6 is a graph of the output signal Vout2 which is a rectification signal rectified by the rectifier circuit 60. The rectifier circuit 60 outputs the output signal Vout2 which is the rectification signal obtained by rectifying the output signal Vout1. The output signal Vout2 has a predetermined voltage V5 which rises at the time point t1. The predetermined voltage V5 is larger than 0 and equal to or smaller than VCC. A threshold value V3 (>0) of the comparator U2 is set to be smaller than a value of the voltage V5 of the output signal Vout2.

Figure 7:
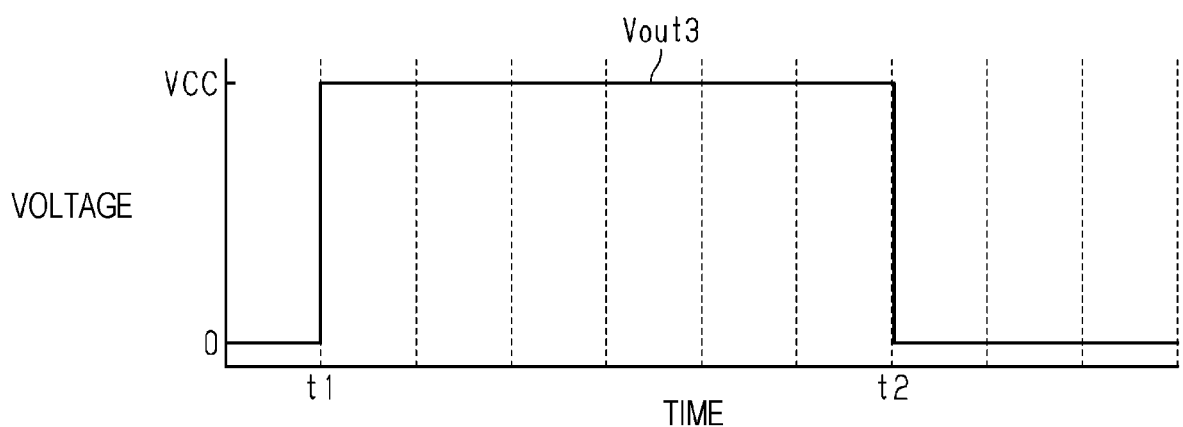
FIG. 7 is a graph of an output signal Vout3 of a comparator circuit included in the static electricity detection circuit.

The output signal Vout3 illustrated in FIG. 7 is output from the comparator circuit 70. The comparator circuit 70 compares the output signal Vout2 of the rectifier circuit 60 with the threshold value V3. The comparator circuit 70 outputs an ON signal of a high level as the output signal Vout3 when the output signal Vout2 is equal to or larger than the threshold value V3 and an OFF signal of a low level as the output signal Vout3 when the output signal Vout2 is smaller than the threshold value V3. Note that the output signals Vout1 to Vout3 are reset at a time point t2 when the discharge circuit 90 causes the rectifier circuit 60 to perform discharge. Specifically, at the time point t2 when the trailing end Mb of the medium M passes the electrode 33, the output signal Vout1 becomes the reference voltage Vref and the output signals Vout2 and Vout3 become a low level (0 V).

Output Signal in Positive Charge

The input signal Vin of FIG. 8 obtained when the electrode 33 is brought into contact with the medium M positively charged by static electricity is input to the static electricity detection circuit 34 from the electrode 33. At the time point t1 when the electrode 33 is brought into contact with the medium M, 0V rises to the voltage V1 (>0). The voltage V1 of the input signal Vin caused by static electricity is in a range from approximately 1 kV to approximately 10 kV. FIG. 8 is a graph of a signal specified by the international standard for evaluating static electricity. The input signal Vin rises to the voltage V1 (>0) in 10 nanoseconds and then falls in 100 nanoseconds. As illustrated in FIG. 8, the input signal Vin instantaneously (in 10 nanoseconds) rises to the voltage V1 (>0) and instantaneously (in 100 nanoseconds) falls, that is, the input signal Vin has peaks generated in a predetermined period.

Next, the output signals Vout1 to Vout3 output from the electrode 33 as results of signal processing performed by the main circuits included in the static electricity detection circuit 34 which receives the input signal Vin illustrated in FIG. 8 will be described with reference to FIGS. 9 to 11.

Figure 9:
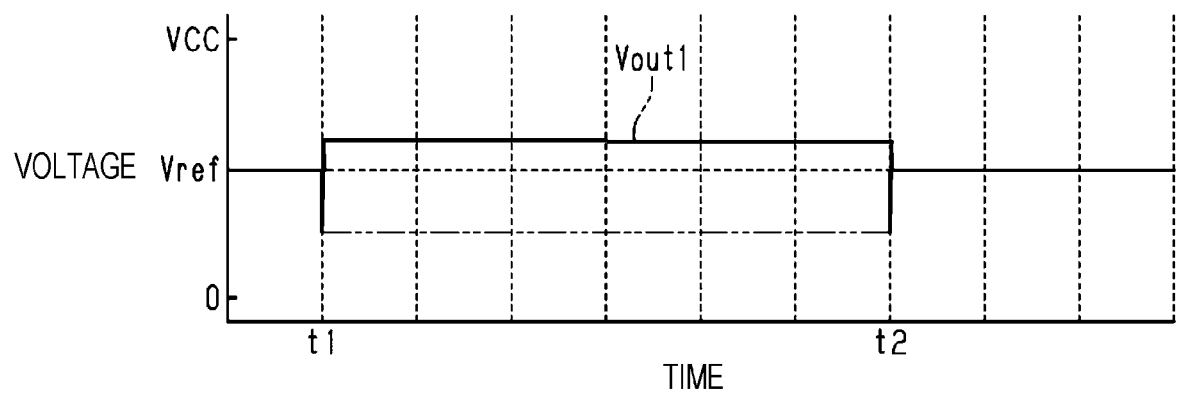
FIG. 9 is a graph of an output signal Vout1 of the amplifier circuit included in the static electricity detection circuit.

As illustrated in FIG. 9, after being clamped to a predetermined voltage Vc or less by the voltage clamp circuit 40, the input signal Vin is amplified by the amplifier circuit 50 and output as the output signal Vout1. The voltage clamp circuit 40 outputs a signal oscillated in the same period as the input signal Vin with an intermediate potential of 0 V in a range in which a maximum oscillation is the predetermined voltage Vc so as to clamp the input signal Vin to the predetermined voltage Vc or less (refer to FIG. 8). The amplifier circuit 50 amplifies a signal output from the voltage clamp circuit 40. Therefore, the amplifier circuit 50 outputs the output signal Vout1 having the voltage which rises at the time point t1 and oscillates in the same period as the input signal Vin with the reference voltage Vref at a center. The maximum oscillation of the output signal Vout1 is suppressed to a voltage obtained by multiplying the predetermined voltage Vc by an amplification factor.

Figure 10:
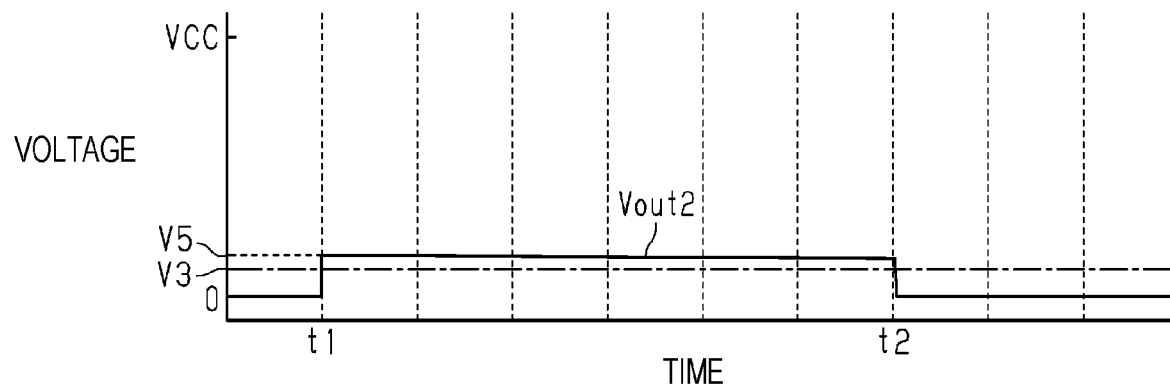
FIG. 10 is a graph of an output signal Vout2 of the rectifier circuit included in the static electricity detection circuit.

FIG. 10 is a graph of the output signal Vout2 which is a rectification signal rectified by the rectifier circuit 60. The rectifier circuit 60 outputs the output signal Vout2 which is the rectification signal obtained by rectifying the output signal Vout1. The output signal Vout2 has a predetermined voltage V5 which rises at the time point t1. The predetermined voltage V5 is larger than 0 and equal to or smaller than VCC. The threshold value V3 (>0) of the comparator U2 is set to be smaller than a value of the voltage V5 of the output signal Vout2.

Figure 11:
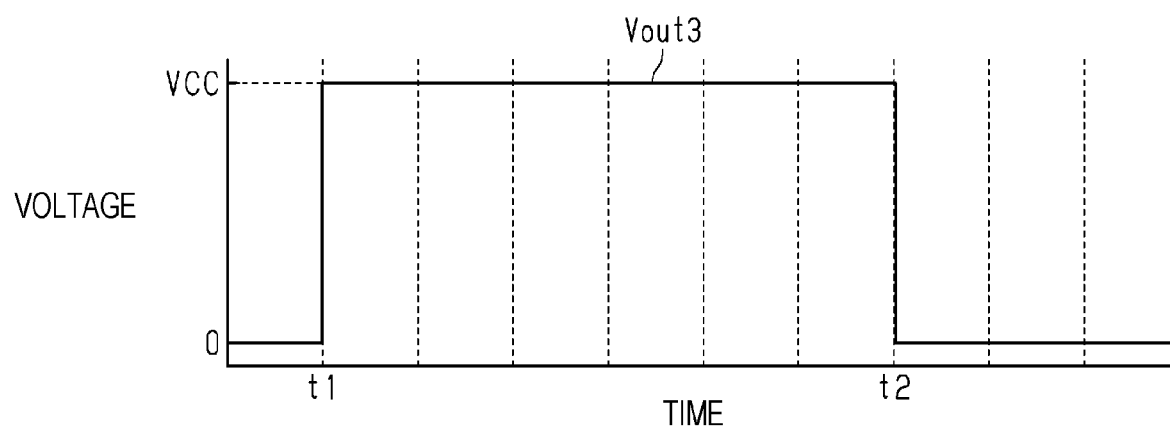
FIG. 11 is a graph of an output signal Vout3 of the comparator circuit included in the static electricity detection circuit.

The output signal Vout3 illustrated in FIG. 11 is output from the comparator circuit 70. The comparator circuit 70 compares the output signal Vout2 of the rectifier circuit 60 with the threshold value V3. The comparator circuit 70 outputs an ON signal of a high level as the output signal Vout3 when the output signal Vout2 is equal to or larger than the threshold value V3 and an OFF signal of a low level as the output signal Vout3 when the output signal Vout2 is smaller than the threshold value V3.

Circuit Constant of High-Pass Filter

Figure 12:
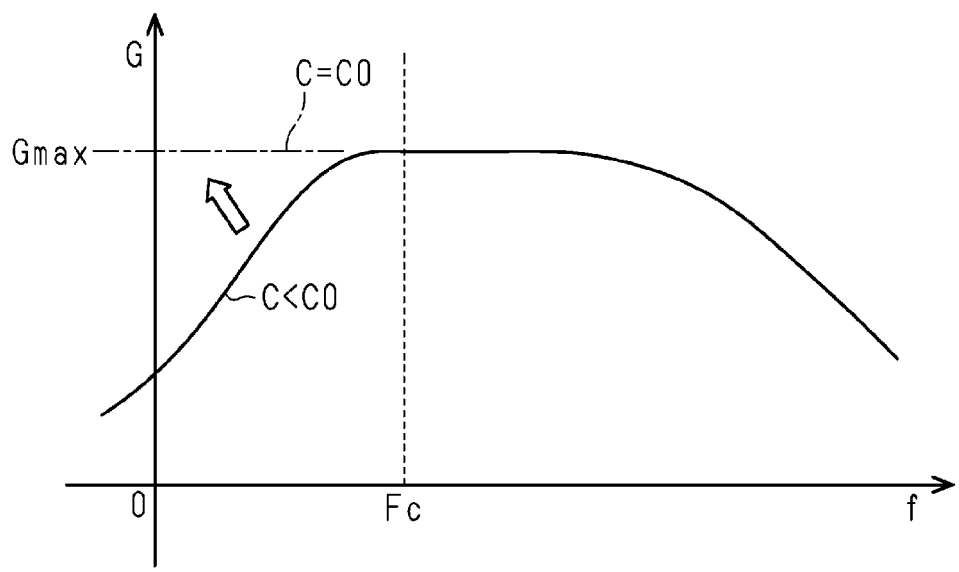
FIG. 12 is a graph of the relationship between a signal frequency and an amplification factor of the amplifier circuit including a high-pass filter disposed in a first stage.

Next, a capacitance of the capacitor C1 included in the high-pass filter 51 will be described with reference to FIG. 12. FIG. 12 is a graph illustrating the relationship between a frequency f of a signal input to the amplifier circuit 50 and an amplification factor G. This relationship is changed by a capacitance C of the capacitor C1.

The capacitor C1 coupled in series between the voltage clamp circuit 40 and the amplifier circuit 50 and the resistor R2 included in the amplifier circuit 50 function as the high-pass filter 51. A cutoff frequency Fc of the high-pass filter 51 is obtained by the following equation using the capacitance C of the capacitor C1 and a resistance value R of the resistor R2.

$$Fc=1/(2\pi CR)$$

Here, when the capacitance C of the capacitor C1 is large, a low frequency component in a signal is amplified. Therefore, a small value is set to the capacitance C since only a high-frequency component of the signal is to be amplified. Specifically, the capacitance C is set such that a low frequency component which is equal to or smaller than the cutoff frequency Fc of the high-pass filter 51 is not amplified. The cutoff frequency Fc has a value of approximately several hundred kHz, for example.

The graph of FIG. 12 illustrates the relationship between a frequency f of a signal and the amplification factor G of the amplifier circuit 50. The amplification factor G of the amplifier circuit 50 has a maximum amplification factor Gmax in a predetermined range equal to or larger than a predetermined frequency and is likely to be reduced as the signal frequency is increased when the predetermined range is exceeded. In the amplifier circuit 50, a circuit constant is set such that a frequency band of an electrostatic signal is within a predetermined frequency range having the maximum amplification factor Gmax. On the other hand, trend of the amplification factor G of the amplifier circuit 50 is varied depending on the capacitance C of the capacitor C1 in a low frequency band which is smaller than the predetermined range.

In a low frequency band which is lower than the cutoff frequency Fc of the high-pass filter 51, the capacitance C of the capacitor C1 is selected such that the amplification factor G is reduced as a signal frequency is reduced. As the capacitance C of the capacitor C1 is increased, a line indicating the relationship between the low frequency band and the amplification factor G shifts in a direction denoted by a white arrow illustrated in FIG. 12. When the capacitance becomes a predetermined value C0, the amplification factor G in the low frequency band becomes substantially equal to the maximum amplification factor Gmax, and when the capacitance C exceeds the predetermined value C0, the amplification factor G in the low frequency band becomes larger than the amplification factor G in the high frequency band.

When the capacitance C of the capacitor C1 is smaller than the predetermined value C0, the amplification factor G of the amplifier circuit 50 is gradually reduced from the maximum amplification factor Gmax in the high-frequency band as a frequency becomes smaller in the low frequency band which is lower than the cutoff frequency Fc. The capacitance C of the capacitor C1 is set to a value smaller than the predetermined value C0 which satisfies a condition in which the amplification factor G of the amplifier circuit 50 in the low frequency band which is lower than the cutoff frequency Fc becomes smaller than the maximum amplification factor Gmax of the amplifier circuit 50 in the high frequency band which is higher than the cutoff frequency Fc of the high-pass filter 51 including the capacitor C1 and the resistor R2. The maximum amplification factor Gmax may be obtained in the high frequency band including a signal frequency of the electrostatic signal which is higher than the cutoff frequency Fc and the amplification factor G in the low frequency band which is lower than the cutoff frequency Fc is reduced to be smaller than the maximum amplification factor Gmax so that a noise component other than the electrostatic signal is efficiently removed.

Next, operation of the image reading apparatus 10 will be described.

The user inputs information on a medium type by operating the operation section 37 of the image reading apparatus 10 or by operating an input device, such as a personal computer, coupled to the image reading apparatus 10. The controller 35 obtains the medium type information. Alternatively, the controller 35 obtains information on a medium type detected by the medium type detection sensor 38 from the medium type detection sensor 38. The controller 35 obtains the threshold value V3 corresponding to the medium type with reference to the reference data stored in the storage section. The controller 35 sets the threshold value V3 which is a reference voltage to the comparator circuit 70.

When receiving a reading instruction based on a user operation, the controller 35 starts reading on the medium M. First, the controller 35 drives the driving motor 27 to supply the medium M. When the driving motor 27 is driven, the supply roller 21 and the separation section 22 rotate and the media M on the medium holding section 11 are fed one by one. In this case, static electricity is charged on a surface of the medium M by friction between the medium M and the separation section 22. The medium M is negatively or positively charged by the static electricity generated by the friction between the medium M and the material (such as gum) of the separation section 22. The leading end Ma of the medium M is brought into contact with the electrode 33 during the supply of the medium M. By this contact, the charge of the static electricity charged on the medium M is moved through the electrode 33.

The input signal Vin from the electrode 33 is input to the static electricity detection circuit 34. The input signal Vin is clamped to the predetermined voltage Vc or less by the voltage clamp circuit 40 and amplified by the amplifier circuit 50 so that the output signal Vout1 is output from the amplifier circuit 50. The output signal Vout1 is rectified by the rectifier circuit 60 so that the rectifier circuit 60 outputs the output signal Vout2. The comparator circuit 70 compares the output signal Vout2 with the threshold value V3 so as to output the output signal Vout3 as a result of the comparison. When the output signal Vout2 is smaller than the threshold value V3, the output signal Vout3 is in a low level, whereas when the output signal Vout2 is equal to or larger than the threshold value V3, the output signal Vout3 is in a high level.

The CPU 36 of the controller 35 receives the output signal Vout3 from the static electricity detection circuit 34. The CPU 36 detects the leading end Ma of the medium M when the output signal Vout3 is switched from a low level to a high level. When detecting the leading end Ma of the medium M, the CPU 36 performs at least one of control of transfer of the medium M, control of a detection of a jam, and reading control. Furthermore, when a plurality of electrodes 33 are provided, skew detection control is performed to detect skew of the medium M.

The controller 35 monitors a position of the trailing end Mb of the medium M. After detecting the leading end Ma, the controller 35 determines that the trailing end Mb has passed the electrode 33 when transport of the medium M being transported by a transport amount corresponding to the medium length is terminated. When detecting the trailing end Mb of the medium M which has passed the electrode 33, the controller 35 outputs an ON signal of the voltage V4 to the discharge circuit 90 of the static electricity detection circuit 34. Consequently, the transistor M1 of the discharge circuit 90 is turned on. When the transistor M1 is turned on, charge stored in the capacitor C6 included in the output stage of the rectifier circuit 60 is discharged. Specifically, the output signal Vout2 of the rectifier circuit 60 is reset to the signal voltage of 0 V by the discharge. In this way, a succeeding medium M which is supplied with an interval after a preceding medium M is supplied is also detected when static electricity charged on a front surface of the succeeding medium M is detected by the electrode 33 and the static electricity detection circuit 34.

According to the first embodiment, the following effects may be attained.

(1) The medium transport device 30 includes the transport section 20 transporting the medium M in a contact manner, the electrode 33 detecting static electricity charged on the medium M, and the static electricity detection circuit 34. The static electricity detection circuit 34 includes the voltage clamp circuit 40 clamping a detection signal input from the electrode 33 to the predetermined voltage Vc, the amplifier circuit 50 amplifying an output signal of the voltage clamp circuit 40, the rectifier circuit 60 rectifying an output signal of the amplifier circuit 50, and the comparator circuit 70 determining whether the medium M exists based on the output signal of the rectifier circuit 60. Therefore, the determination as to whether the medium M exists may be made by detecting static electricity charged on the medium M. Although a signal indicating detection of static electricity has a high voltage, the voltage clamp circuit 40 clamps the high voltage to the predetermined voltage Vc, and accordingly, destroy of circuits, such as the amplifier circuit 50, may be avoided. Furthermore, use of the electrode 33 may simplify the configuration, and the medium M may be detected at high speed with less response lag since the static electricity charged on the medium M is utilized. Accordingly, the transported medium M may be detected at high speed with a simple configuration.

(2) The medium transport device 30 includes the discharge circuit 90 resetting an output signal of the rectifier circuit 60 by discharge and the controller 35 controlling the discharge circuit 90 so as to cause the rectifier circuit 60 to perform discharge at a timing after an upstream end of the medium M in the transport direction passes the electrode 33 and before a preceding medium M reaches the electrode 33. Accordingly, the rectifier circuit 60 performs discharge at a timing after the upstream end of the medium M in the transport direction X passes the electrode 33 and before the succeeding medium M reaches the electrode 33, and therefore, static electricity charged on the succeeding medium M may be detected after the discharge. In this way, when a plurality of media M are transported with an interval, the plurality of media M may be individually detected.

(3) When detecting the leading end Ma which is the downstream end of the medium M in the transport direction X and determining that the trailing end Mb which is the upstream end of the medium M in the transport direction X has passed the electrode 33 based on an amount of transport of the medium M performed by the transport section 20, the controller 35 controls the discharge circuit 90 so as to reset the output signal of the rectifier circuit 60.

Therefore, it may be determined that the upstream end of the medium M has passed the electrode 33 based on the transport amount of the medium M obtained after the downstream end of the medium M is detected. Accordingly, a sensor detecting the upstream end of the medium M which has passed the electrode 33 may not be disposed.

(4) The medium transport device 30 includes the medium type detection sensor 38 which is an example of a medium type obtaining section obtaining a medium type indicating a type of the medium M. The controller 35 sets the threshold value V3 based on a medium type to the comparator circuit 70 which compares an output signal with the threshold value V3 so as to detect the medium M. Therefore, since the threshold value V3 is changed depending on a medium type, the comparator circuit 70 may detect the medium M with high accuracy.

(5) The voltage clamp circuit 40 and the amplifier circuit 50 are coupled to each other through the capacitor C1. The amplifier circuit 50 includes the resistor R2 coupled to the capacitor C1 in series. The capacitor C1 and the resistor R2 constitute the high-pass filter 51. The capacitance of the capacitor C1 is set to a value smaller than the predetermined value which satisfies the condition in which the amplification factor G of the amplifier circuit 50 in the low frequency band which is lower than the cutoff frequency Fc becomes smaller than the maximum amplification factor Gmax of the amplifier circuit 50 in the high frequency band which is higher than the cutoff frequency Fc of the high-pass filter 51. Therefore, the high frequency band including a signal component of static electricity higher than the cutoff frequency Fc may be highly amplified while amplification of an unrequired low frequency band lower than the cutoff frequency Fc is suppressed.

Therefore, the comparator circuit 70 may detect the medium M with high accuracy.

(6) The image reading apparatus 10 includes the medium transport device 30 and the reading sections 12 and 13 reading the medium M. Therefore, the image reading apparatus 10 may attain the effects of the medium transport device 30 and easily detect the medium M to be read.

(7) The static electricity detection circuit 34 receives the input signal Vin as a detection signal from the electrode 33 disposed in a position to be in contact with the medium M on the transport path of the statistically-charged medium M so as to detect the medium M. The static electricity detection circuit 34 includes the voltage clamp circuit 40 clamping the input signal Vin input from the electrode 33 to the predetermined voltage Vc, the amplifier circuit 50 amplifying an output signal of the voltage clamp circuit 40, the rectifier circuit 60 rectifying an output signal Vout1 of the amplifier circuit 50, and the comparator circuit 70 determining whether the medium M exists based on the output signal Vout2 of the rectifier circuit 60.

Second Embodiment

Although the comparator circuit 70 is disposed as an example of a determination circuit in the first embodiment, a CPU 36 of a controller 35 constitutes an example of a determination circuit detecting a medium M in a second embodiment. A static electricity detection circuit 34 does not include the comparator circuit 70 and outputs an output signal Vout2 which is an output signal of a rectifier circuit 60.

The CPU 36 receives the output signal Vout2 from the static electricity detection circuit 34. The CPU 36 receives the output signal Vout2 as a digital signal. The CPU 36 obtains a threshold value V3 corresponding to a medium type with reference to reference data stored in a storage section based on information on the medium type. The CPU 36 compares a value of the output signal Vout2 supplied from the static electricity detection circuit 34 with the threshold value V3 and detects a leading end Ma of the medium M when the value of the output signal Vout2 which is smaller than the threshold value V3 becomes a value equal to or larger than the threshold value V3. The CPU 36 determines that the medium M is not detected when the value of the output signal Vout2 is smaller than the threshold value V3 and determines that the medium M is detected when the value of the output signal Vout2 is equal to or larger than the threshold value V3.

The CPU 36 compares a voltage value of the output signal Vout2 output from the static electricity detection circuit 34 with the threshold value V3 so as to determine whether the output signal Vout2 is equal to or larger than the threshold value V3 every predetermined time interval. The CPU 36 detects the leading end Ma of the medium M when the determination that the medium M is not detected is switched to the determination that the medium M is detected, and detects a trailing end Mb of the medium M when the determination that the medium M is detected is switched to the determination that the medium M is not detected.

As described in the second embodiment, the static electricity detection circuit 34 may not include the comparator circuit 70 and the CPU 36 of the controller 35 may function as a determination circuit detecting the medium M.

Note that the foregoing embodiments may be changed as modifications described below. Furthermore, the foregoing embodiments and the modifications below may be appropriately combined with each other as further modifications, or the modifications described below may be appropriately combined with each other as still further modifications.

Figure 13:
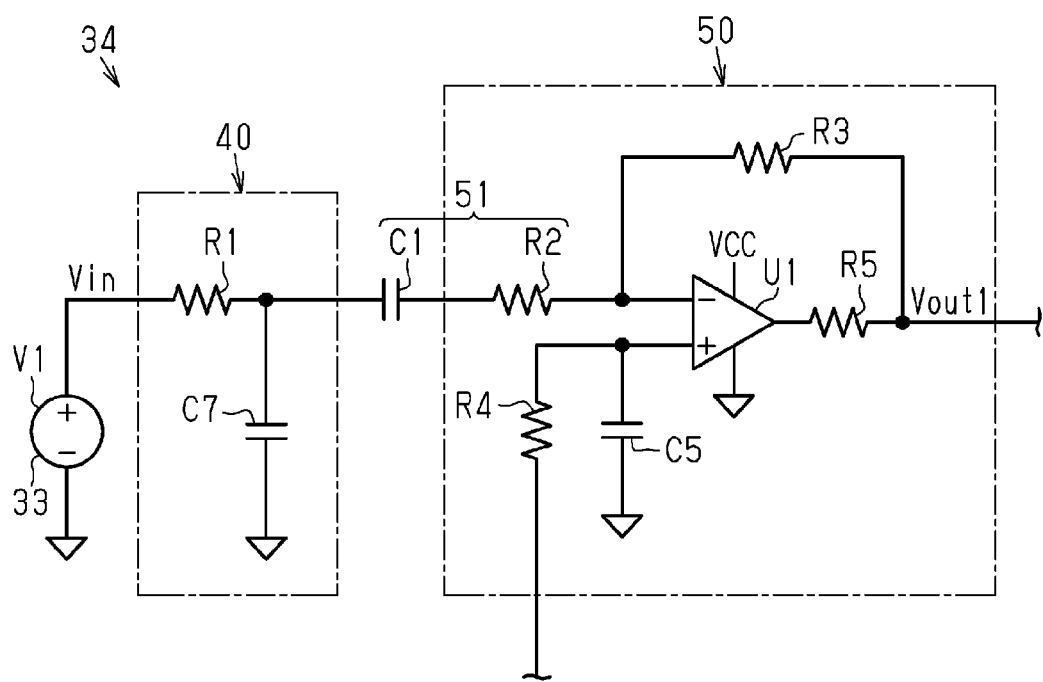
FIG. 13 is a circuit diagram illustrating a static electricity detection circuit according to a modification.

As illustrated in FIG. 13, a voltage clamp circuit 40 may include a resistor R1 and a capacitor C7. Since a period of time in which a voltage peak of static electricity is generated is considerably short, when a time constant of the resistor R1 and the capacitor C7 is set to an appropriate value, an output signal output from the voltage clamp circuit 40 to an amplifier circuit 50 may be clamped to a predetermined voltage Vc for avoiding destroy of the amplifier circuit 50.

A position of an electrode 33 may be appropriately changed. The electrode 33 may be disposed in a downstream position relative to transport rollers 23 and 24 in a transport direction X. In this case, static electricity is generated on a medium M due to friction between the medium M and the transport rollers 23 and 24, and therefore, the electrode 33 and the static electricity detection circuit 34 may detect the medium M. Furthermore, the electrode 33 may be disposed on a downstream of reading sections 12 and 13 in the transport direction X. Moreover, the electrode 33 may be disposed in a downstream position relative to discharge rollers 25 and 26.

The electrode 33 may be in contact with a back surface of the medium M.

An electrostatic detection sensor 31 including an electrode 33 may be disposed instead of the second sensor 32.

Two or more electrodes may be disposed.

A method employed in the transport section 20 is not limited to a roller transport method and a belt transport method may be employed.

The transport section 20 at least causes the medium M to have static electricity caused by frictional electrification or peeling electrification generated by friction or peeling.

A sensor for detecting a medium type which determines a medium type of the medium M may include a light source emitting light on a front surface of a medium and an imaging section imaging a portion on which the light emitted to the front surface of the medium from the light source is reflected, for example.

An electronic apparatus including a medium transport device 30 is not limited to an image reading apparatus 10. The electronic apparatus may be a printing apparatus including the medium transport device 30. The printing apparatus, such as a line printer, includes the transport section 20 transporting a medium at a constant speed and an ejection head including a line head having a plurality of nozzles in a range slightly larger than a maximum width of the medium M. The ejection head ejects liquid, such as ink, to the medium M transported by the transport section 20 at a constant speed so as to print characters or an image on the medium M. The transport section 20 includes the separation section 22 which separates media one by one. The printing apparatus may include the electrode 33 disposed in a downstream position relative to the separation section 22 in the transport direction X of the medium M and the static electricity detection circuit 34 electrically coupled to the electrode 33, and at least one of the leading end Ma and the trailing end Mb of the medium M being transported may be detected.

The image reading apparatus may be a multifunction peripheral disposed in an upper portion of the printing apparatus. The multifunction peripheral may be employed as long as the image reading apparatus employs a feeding method for feeding the medium M.

The electronic apparatus may be apparatuses other than the image reading apparatus and the printing apparatus. The electronic apparatus at least includes a medium transport device. The medium M is not limited to paper and may be an insulating substrate of a sheet form or a film form.

Hereinafter, technological concept and effects recognized in the foregoing embodiments and the foregoing modifications will be described.

The medium transport device includes a transport section transporting a medium in a contact manner, an electrode detecting static electricity charged on the medium, a voltage clamp circuit clamping a detection signal input from the electrode to a predetermined voltage, an amplifier circuit amplifying an output signal of the voltage clamp circuit, a rectifier circuit rectifying an output signal of the amplifier circuit, and a determination circuit determining whether the medium M exists based on an output signal of the rectifier circuit.

With this configuration, a determination as to whether a medium exists may be made by detecting static electricity charged on the medium. Furthermore, although a signal in which static electricity is detected has a high voltage, the voltage clamp circuit clamps the high voltage to a predetermined voltage, and therefore, destroy of a circuit, such as the amplifier circuit may be avoided. In addition, use of the electrode may simplify the configuration, and the medium M may be detected at high speed with less response lag since the static electricity charged on the medium is used. Accordingly, the transported medium may be detected at high speed with a simple configuration.

The medium transport device includes a discharge circuit resetting an output signal of the rectifier circuit by discharge and a controller controlling the discharge circuit so as to cause the rectifier circuit to perform discharge at a timing after an upstream end of the medium in the transport direction passes the electrode and before a succeeding medium reaches the electrode.

With this configuration, the rectifier circuit performs discharge at a timing after the upstream end of the medium M in the transport direction passes the electrode and before a succeeding medium reaches the electrode, and therefore, static electricity charged on the succeeding medium may be detected after the discharge. In this way, when a plurality of media are transported with an interval, the plurality of media may be individually detected.

In the medium transport device, when the controller detects a downstream end of the medium in the transport direction and determines that the upstream end of the medium in the transport direction has passed the electrode based on an amount of transport of the medium performed by the transport section, the CPU controls the discharge circuit so as to cause the rectifier circuit to perform discharge.

With this configuration, an upstream end of a medium which has passed the electrode may be detected based on a transport amount of a medium obtained after the downstream end of the medium is detected. Accordingly, a sensor detecting the upstream end of the medium which has passed the electrode is not required.

The medium transport device includes a medium type obtaining section obtaining a medium type indicating a type of the medium, and the controller sets a threshold value based on the medium type to the determination circuit which compares the output signal with the threshold value so as to detect the medium.

With this configuration, since the threshold value is changed depending on a medium type, the determination circuit may detect the medium with high accuracy.

In the medium transport device, the voltage clamp circuit and the amplifier circuit are coupled to each other through a capacitor, the amplifier circuit includes a resistor coupled to the capacitor in series, a high-pass filter is configured by the capacitor and the resistor, and a capacitance of the capacitor is set to a value smaller than a predetermined value which satisfies a condition in which an amplification factor of the amplifier circuit in a low frequency band which is lower than the cutoff frequency becomes smaller than a maximum amplification factor of the amplifier circuit in a high frequency band which is higher than the cutoff frequency of the high-pass filter.

With this configuration, the high frequency band including a signal component of static electricity higher than the cutoff frequency may be highly amplified while amplification of an unrequired low frequency band lower than the cutoff frequency is suppressed. Therefore, the determination circuit may detect the medium with high accuracy.

The image reading apparatus includes the medium transport device and reading sections reading the medium. With this configuration, the image reading apparatus may attain the effects of the medium transport device and easily detect the medium to be read.

The static electricity detection circuit detects the medium by receiving a detection signal from the electrode disposed in a position such that the electrode may be in contact with the medium on the transport path of the medium charged by the static electricity. The static electricity detection circuit includes a voltage clamp circuit clamping the detection signal supplied from the electrode to a predetermined voltage, an amplifier circuit amplifying an output signal of the voltage clamp circuit, a rectifier circuit rectifying an output signal of the amplifier circuit, and a determination circuit determining whether the medium exists based on an output signal of the rectifier circuit. With this configuration, the effects of the medium transport device may be attained.

What is claimed is:

1. A medium transport device comprising:
   a transport section configured to transport a medium in a contact manner;
   an electrode configured to detect static electricity charged on the medium transported by the transport section;
   a voltage clamp circuit configured to clamp a detection signal supplied from the electrode to a predetermined voltage;
   an amplifier circuit configured to amplify an output signal of the voltage clamp circuit;
   a rectifier circuit configured to rectify an output signal of the amplifier circuit; and
   a determination circuit configured to detect the medium based on an output signal of the rectifier circuit.

2. The medium transport device according to claim 1, further comprising:
   a discharge circuit configured to reset the output signal of the rectifier circuit by discharge; and
   a controller configured to control the discharge circuit so as to cause the rectifier circuit to perform discharge at a timing after an upstream end of the medium in a transport direction passes the electrode and before a succeeding medium reaches the electrode.

3. The medium transport device according to claim 2, wherein the controller controls the discharge circuit so as to cause the rectifier circuit to perform discharge when the controller detects a downstream end of the medium in the transport direction and determines that the upstream end of the medium in the transport direction passes the electrode based on an amount of transport of the medium performed by the transport section.

4. The medium transport device according to claim 2, further comprising:
a medium type obtaining section configured to obtain a medium type indicating a type of the medium,
wherein the controller sets a threshold value for the medium type in the determination circuit based on the medium type obtained by the medium type obtaining section, and
wherein the determination circuit detects the medium by comparing the output signal with the threshold value.

5. The medium transport device according to claim 1,
wherein the voltage clamp circuit and the amplifier circuit are coupled to each other through a capacitor,
wherein the amplifier circuit includes a resistor coupled to the capacitor in series,
wherein the capacitor and the resistor are included in a high-pass filter, and
wherein a capacitance of the capacitor is smaller than a predetermined value which satisfies a condition in which an amplification factor of the amplifier circuit in a low frequency band which is lower than a cutoff frequency of the high-pass filter becomes smaller than a maximum amplification factor of the amplifier circuit in a high frequency band which is higher than the cutoff frequency.

6. An image reading apparatus comprising:
the medium transport device according to claim 1; and
a reading section configured to read the medium.

7. A static electricity detection circuit detecting a medium by receiving a detection signal from an electrode disposed in a position to be in contact with the medium on a transport path of a medium charged by static electricity, the static electricity detection circuit comprising:
a voltage clamp circuit configured to clamp a detection signal supplied from the electrode to a predetermined voltage;
an amplifier circuit configured to amplify an output signal of the voltage clamp circuit;
a rectifier circuit configured to rectify an output signal of the amplifier circuit; and
a determination circuit configured to detect the medium based on an output signal of the rectifier circuit.

* * * * *